US011212540B2

(12) United States Patent
Stolt

(10) Patent No.: US 11,212,540 B2
(45) Date of Patent: Dec. 28, 2021

(54) VIDEO DATA PROCESSING SYSTEM

(71) Applicant: ARM Limited, Cambridge (GB)

(72) Inventor: Fredrik Peter Stolt, Lund (SE)

(73) Assignee: Arm Limited, Cambridge (GB)

( * ) Notice: Subject to any disclaimer, the term of this patent is extended or adjusted under 35 U.S.C. 154(b) by 85 days.

(21) Appl. No.: 15/609,961

(22) Filed: May 31, 2017

(65) Prior Publication Data

US 2017/0359589 A1     Dec. 14, 2017

(30) Foreign Application Priority Data

Jun. 10, 2016   (GB) ..................... 1610170

(51) Int. Cl.
*H04N 19/30*   (2014.01)
*H04N 19/51*   (2014.01)
*H04N 19/105*  (2014.01)
*H04N 19/59*   (2014.01)
*H04N 19/172*  (2014.01)

(52) U.S. Cl.
CPC ........... *H04N 19/30* (2014.11); *H04N 19/105* (2014.11); *H04N 19/51* (2014.11); *H04N 19/59* (2014.11); *H04N 19/172* (2014.11)

(58) Field of Classification Search
None
See application file for complete search history.

(56) References Cited

U.S. PATENT DOCUMENTS

2012/0191805 A1*  7/2012  Fee ............... H04N 21/222
                                                   709/217
2014/0092964 A1   4/2014  Ugur et al.
(Continued)

FOREIGN PATENT DOCUMENTS

JP    H10-117354    5/1998
JP    2008-079152   4/2008
(Continued)

OTHER PUBLICATIONS

GB Search Report dated Dec. 9, 2016, GB Patent Application GB1610170.1.
(Continued)

*Primary Examiner* — Kaitlin A Retallick
(74) *Attorney, Agent, or Firm* — Vierra Magen Marcus LLP

(57) ABSTRACT

A system for encoding and decoding a sequence of frames of video data. The system includes encoding processing circuitry configured to encode a sequence of source video frames using other source frames as reference frames. The encoding processing circuitry is also configured, when encoding a new source frame that has a different resolution to the resolution of a reference frame, to generate a scaled copy of the reference frame for the new source frame. The encoding processing circuitry is also configured to encode the new source frame using the scaled copy of the reference frame to provide output encoded video image data. The system also includes a video decoder configured to decode the encoded scaled copy of the reference frame and decode the encoded source frame using the decoded scaled copy of the reference frame to provide output video image data for the source frame.

13 Claims, 4 Drawing Sheets

(56) References Cited

U.S. PATENT DOCUMENTS

| 2015/0071339 | A1* | 3/2015 | Wang | H04N 19/137 |
| | | | | 375/240.02 |
| 2017/0013233 | A1* | 1/2017 | Kuusela | H04N 7/0117 |
| 2017/0105018 | A1* | 4/2017 | Wu | H04N 19/503 |

FOREIGN PATENT DOCUMENTS

| JP | 2012-169765 | 9/2012 |
| KR | 10-2015-0065763 | 6/2015 |
| WO | WO2015/188585 | 12/2015 |

OTHER PUBLICATIONS

Davies, "AHG18: Design considerations for Adaptive Resolution Coding (ARC)", Joint Collaborative Team on Video Coding (JCT-VC) of ITU-T SG16 WP3 and ISO/IEC JTC1/SC29/WG11, 8th Meeting: San Jose, CA, US, Feb. 1-10, 2012.

Notice of Reasons for Rejection dated Mar. 12, 2021, Japanese Application No. 2017-114157.

Notification of Reason for Refusal dated Jul. 9, 2021, Chinese Application No. 10-2017-0069439.

* cited by examiner

VIDEO DATA PROCESSING SYSTEM

BACKGROUND

The technology described herein relates to the processing of video data, and in particular to methods of and systems for encoding and decoding video image data.

So that video images may be generated by one device (e.g. a video camera) and then transmitted (streamed) over a link (e.g. via the internet) to be viewed on another device (e.g. a computer), video image data (e.g. RGB or YUV values) is generally encoded for transmission in the format of an encoded bitstream, according to a predetermined video encoding format, such as VP9. Video encoding formats such as VP9 can enable a significant reduction in the file size of video image data (which thus aids the efficient streaming of the video image data) without a significant visible loss of image quality when the video images are viewed.

Video image data is typically generated as a sequence of frames. In "differential" video coding standards such as VP9, frames in the sequence of frames to be encoded (which can be thought of as "source" frames to be encoded) are usually encoded with reference to another, e.g. previous, frame or frames of the sequence of frames to be encoded (which other frame or frames can accordingly be thought of as a "reference" frame(s) for the (source) frame being encoded). (In VP9, this is usually done by dividing each source frame into a plurality of blocks of pixels and encoding (and subsequently decoding) each block with respect to other encoded data, e.g. a reference block from a reference frame.)

Each encoded data block for a source frame that has been encoded would therefore usually be defined by a vector value (the so-called "motion vector") pointing to the corresponding data block in the corresponding reference frame and data (the "residual") describing the differences between the data in the source (i.e. current) frame data block and the reference frame data block. (This thereby allows the video data for the block of the source (current) frame to be constructed from the video data pointed to by the motion vector and the difference data describing the differences between that block of the reference frame and the block of the source frame.)

In order to best match the data streaming rate of the encoded video image data to the bandwidth available for transmission of the encoded video image data, e.g. to attempt to maximise the resolution (and thus the viewing quality) of the video frames being transmitted while also minimising any interruptions (e.g. time lag) between consecutive frames (to thus maintain the continuous display of the frames being streamed and, e.g., subsequently viewed), it may be desirable to change the resolution of the video frames being encoded and transmitted when the available bandwidth changes. As the resolution of the video frames is an important factor in determining the amount of data to be streamed, changing the resolution periodically helps to match the data streaming rate of the video image data to the bandwidth available for its transmission.

The Applicants believe that there remains scope for improvements to methods of and systems for encoding and decoding video image data.

BRIEF DESCRIPTION OF THE DRAWINGS

A number of embodiments of the technology described herein will now be described by way of example only and with reference to the accompanying drawings, in which.

DETAILED DESCRIPTION

Figure 1:
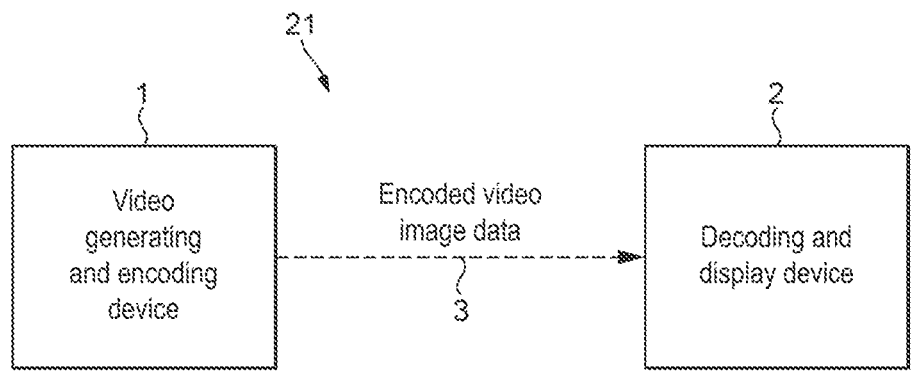
FIGS. 1 and 2 show schematically a system for encoding and decoding video image data according to an embodiment of the technology described herein.

An embodiment of the technology described herein comprises a method of encoding and decoding frames of a sequence of frames of video data when using a video encoding process that encodes at least some frames of a sequence of source video frames to be encoded using one or more source frames in the sequence of source video frames to be encoded as reference frames;

the method comprising:

when it is desired to encode a new source frame in a sequence of source frames being encoded that has a resolution that is different to the resolution of another frame in the sequence of source frames being encoded that is to act as a reference frame for the new source frame:

generating a scaled copy of the another frame in the sequence of source frames being encoded that is to act as a reference frame for the new source frame that is scaled to the resolution of the new source frame to act as a reference frame for the new source frame;

encoding the generated scaled copy of the another frame to provide output encoded video image data representing the generated scaled copy of the another frame;

encoding the new source frame using the scaled copy of the another frame as a reference frame to provide output encoded video image data representing the new source frame;

transmitting the encoded video image data representing the scaled copy of the another frame and the encoded video image data representing the new source frame to a video decoder;

at the video decoder:

decoding the encoded video image data for the scaled copy of the another frame; and decoding the encoded video image data for the new source frame using the decoded scaled copy of the another frame as a reference frame to provide output video image data for the new source frame.

Another embodiment of the technology described herein comprises a system for encoding and decoding frames of a sequence of frames of video data, the system comprising:

encoding processing circuitry configured to:

encode at least some frames of a sequence of source video frames to be encoded using one or more source frames in the sequence of source video frames to be encoded as reference frames;

the encoding processing circuitry further being configured to:

when it is desired to encode a new source frame in a sequence of source frames being encoded that has a resolution that is different to the resolution of another frame in the sequence of source frames being encoded that is to act as a reference frame for the new source frame:

generate a scaled copy of the another frame in the sequence of source frames being encoded that is to act as a reference frame for the new source frame that is scaled to the resolution of the new source frame to act as a reference frame for the new source frame;

encode the generated scaled copy of the another frame to provide output encoded video image data representing the generated scaled copy of the another frame; and encode the new source frame using the scaled copy of the another frame as a reference frame to provide output encoded video image data representing the new source frame;

the system further comprising:

processing circuitry configured to transmit the encoded video image data representing the scaled copy of the another frame and the encoded video image data representing the new source frame to a video decoder;

and a video decoder comprising decoding processing circuitry configured to:

when it receives encoded video image data for a source frame that was encoded using a scaled copy of another source frame as a reference frame:

decode received encoded video image data for the scaled copy of the another source frame; and decode the encoded video image data for the source frame that was encoded using a scaled copy of another source frame as a reference frame using the decoded scaled copy of the another frame as a reference frame to provide output video image data for the source frame that was encoded using a scaled copy of another source frame as a reference frame.

In the technology described herein, a sequence of frames is encoded (e.g. using encoding processing circuitry) for transmission (streaming) to a video decoder (e.g. comprising decoding processing circuitry) by encoding source frames in the sequence using frames in the sequence as reference frames. The reference frames are derived from one or more other source frames in the sequence of source frames (i.e. source frames in the sequence that are not the source frame being encoded). The transmitted sequence of encoded frames is then decoded (e.g. using decoding processing circuitry) to provide output video image data for the sequence of frames, e.g. for display.

Owing, for example, to changes in the bandwidth available for transmitting the (bitstream of) encoded video image data, the resolution of the frames received by the encoder for encoding may change. In order to encode a source frame that is at a different, "new" resolution to the resolution of another (e.g. a previous) frame relative to which it is to be encoded, a scaled copy of the another frame that is to act as the reference frame is made, the scaled copy having a resolution that is equal to the resolution of the (new) source frame. The new, different resolution source frame is then encoded using the scaled copy as a reference frame, e.g. in a conventional manner, instead of encoding the source frame relative to the original another frame at the different resolution.

The encoded source frame and the encoded scaled copy reference frame are transmitted (e.g. streamed) to a video decoder (comprising decoding processing circuitry) for subsequent decoding, i.e. the scaled copy reference frame is provided as a frame in the encoded bitstream that is transmitted to the video decoder. The decoding processing circuitry, e.g. on receipt of the transmitted encoded video data (including the encoded source frame and the scaled copy reference frame), decodes the encoded source frame (at the new resolution) using the scaled copy reference frame as the reference frame for the decoding process.

As will be discussed further below, the scaled copy reference frame (the scaled copy of the previous frame) is, in an embodiment, not displayed, but is rather is set as a "hidden" frame that is simply used for the purposes of encoding and decoding the source frame at the new resolution.

Creating a scaled copy reference frame, relative to which the source frame at the new resolution is encoded, at the same resolution as the new source frame, allows the (copy of the) another frame that is to act as the reference frame to be scaled (to the resolution of the new source frame) before being provided for encoding the new source frame. This means that the source frame at the new resolution can then be encoded relative to a frame having the same resolution (namely the scaled copy reference frame), rather than having to be encoded using the original another frame that is at a different resolution.

This, for example, thus separates the filtering operation (e.g. in VP9 that currently performs both scaling and motion compensation together) into an initial scaling operation to generate the scaled copy for use as the reference frame, and a subsequent motion compensation operation when using the scaled copy reference frame to encode the source frame. This means that the another frame to be scaled can be scaled without first having to calculate any motion vectors (which is necessary when the scaling and motion compensation are performed together in a single filtering operation).

As the encoding processing circuitry may already be configured to perform scaling and differential encoding, it may not be necessary to provide any additional, e.g. dedicated, hardware in order to generate the scaled copy for use as the reference frame (e.g. in advance of any combined scaling and motion compensation hardware that already exists in the encoding pipeline).

Encoding the source frame relative to a scaled copy reference frame also requires very few, if any, changes to the decoder. This is because the decoding processing circuitry can simply decode the encoded source frame using the scaled copy reference frame rather than the original another frame.

The sequence of source frames of video data that are encoded and decoded in the technology described herein may be any suitable and desired sequence of video frames. There will be at least two frames in the sequence of video frames, but in an embodiment there are more than two frames in the sequence of video frames.

In an embodiment the sequence of frames to be encoded is provided in the form of a bitstream of video image data representing the sequence of frames of video data that is then encoded, transmitted and decoded in the manner of the technology described herein to provide a sequence of output video frames, e.g., and in an embodiment, for the purposes of display.

Thus in an embodiment the method comprises (and the encoding processing circuitry is configured to) receiving a sequence of source frames of video data to be encoded, and in response to a change in the resolution of the frames in the sequence of source frames, encoding a source frame or frames in the manner of the technology described herein.

A change in resolution of the source frames in the sequence of source frames to be encoded may be determined, e.g. detected, in any suitable and desired way. For example, the encoding processing circuitry may be configured to detect that the resolution of a new source frame (e.g. that the encoding processing circuitry receives for encoding)

is different from the resolution of a or the previous source frame (e.g. to detect that the resolution of the source frame to be encoded has changed from the previous source frame that was encoded).

However, in an embodiment the system includes a host processor (e.g. a CPU or GPU that, e.g., generates and/or provides the sequence of source frames to be encoded) that signals, e.g. to the encoding processing circuitry, to indicate that the resolution of a source frame in the sequence of source frames (and thus the resolution at which the encoding processing circuitry will need to encode the frames of video image data) is different from the resolution of another source frame, e.g. owing to changes in the bandwidth that is available for streaming the encoded video data.

Thus in an embodiment the system comprises host processing circuitry configured to indicate to the encoding processing circuitry when the resolution of a source frame in a sequence of frames to be encoded is different to the resolution of a (or the) another frame in the sequence of source frames to be encoded.

Correspondingly, in an embodiment the method comprises indicating that a source frame to be encoded has a resolution that is different to the resolution of a or the another source frame, when the resolution of the (next) source frame in the sequence of frames to be encoded is different to the resolution of a or the another source frame.

The indication, e.g. to the encoding processing circuitry from the host processing circuitry, may be provided in any suitable and desired way. For example, the indication may accompany the source frame to be encoded (when the resolution of the source frame is different from another source frame), e.g. in the form of a flag. Alternatively or additionally the indication may comprise a signal that is separate from the source frame, e.g. signalled directly from the host to the encoding processing circuitry.

The host may determine that the resolution of the source frame to be encoded is or needs to be different from the resolution of the another source frame in any suitable and desired way. In an embodiment the host monitors the bandwidth available for streaming (transmitting) the encoded video image data to detect changes (increases or decreases) in the available bandwidth, e.g. such that the host then changes the resolution at which the source frames in the sequence of source frames are generated or provided, and then indicates to the encoding processing circuitry that the resolution of the (next) source frame to be encoded is different from the another source frame.

It will be appreciated that the change in resolution of the source frames may be a decrease, e.g. owing to a reduction in the available bandwidth, or may be an increase, e.g. owing to a (subsequent) improvement in the available bandwidth.

The reference frame may be generated (e.g. derived) from the another frame in the sequence of source video frames (i.e. a source frame other than the source frame being encoded) in any suitable and desired way. In an embodiment the reference frame is derived from a previously encoded (and, e.g., decoded) source frame. Thus in an embodiment the reference frame comprises a scaled copy of a reconstructed source frame, e.g. that has been encoded and decoded (such that the reference frame, although derived from the another source frame, may not be a scaled copy of the original source frame).

The another frame of video data that is scaled to provide the scaled reference frame (i.e. the another frame from which the reference frame is derived) for encoding and decoding the new, "changed resolution" source frame may be any other frame in the sequence of source frames. It should be, and in an embodiment is, a frame in the sequence of source frames that has been previously encoded (a previously encoded frame), but it does not necessarily have to be a previous frame in the sequence of source frames (as an encoder can encode frames out of order, in order to get a reference from a future, and/or from both a previous and a future frame, etc., in a sequence of source frames being encoded, when desired).

Thus the another frame of video data that is scaled to provide the scaled reference frame (i.e. the another frame from which the reference frame is derived) may be a future frame in the sequence of source frames (i.e. that follows the changed resolution source frame in the sequence of source frame), as well as being a previous frame in the sequence of source frames.

In an embodiment the another frame of video data that is scaled to provide the scaled reference frame for encoding and decoding the new, "changed resolution" source frame is a previous frame in the sequence of source frames (although as noted above, that is not essential).

In this case, the previous frame of video data that is scaled to provide the scaled reference frame for encoding and decoding the new, "changed resolution" source frame may be any previous frame in the sequence of source frames.

In one embodiment the frame used for the scaled reference frame is the immediately preceding source frame in the sequence of source frames to the new, changed-resolution source frame to be encoded.

However, this is not essential, and the previous frame that is scaled to provide the scaled reference frame could be an earlier frame in the sequence of source frames to be encoded (i.e. that is spaced by other source frames from the new, changed resolution source frame to be encoded).

It would also be possible to encode (and correspondingly decode) the new, "changed resolution" source frame with reference to plural other frames in the sequence of source frames (e.g. a previous and a future frame in the sequence of source frames), when desired. For example, in VP9 video encoding up to three reference frames can be used for encoding a frame. Other video coding standards can use up to 16 reference frames.

Thus, in an embodiment, the new, "changed resolution" source frame is encoded with reference to plural other frames in the sequence of source frames (e.g. with reference to a previous frame and to a future frame in the sequence of source frames).

In the case where the changed resolution source frame being encoded is to be encoded with reference to plural other frames in the sequence of source frames, then each such reference frame in the sequence of source frames should be, and in an embodiment is, correspondingly first scaled to match the resolution of the new, changed resolution source frame, and then the new, changed resolution source frame is encoded with respect to the scaled copies of each of the other, reference frames.

The another frame (or frames) that is scaled to provide the scaled reference frame for encoding the new, changed resolution source frame should be appropriately stored (e.g. buffered) for the purposes of being scaled to provide the scaled copy reference frame. This can be achieved in any suitable and desired manner.

Where the encoding process (encoding processing circuitry) is configured to (automatically) store source frames that are to act as reference frames for source frames in a sequence of source frames to be encoded, then the already stored copy of the another frame (at its original resolution) that would have served as a reference frame for the source frame being encoded when there had not been a resolution change, can be, and in an embodiment is, retrieved from where it is stored for the purposes of scaling it.

Thus in an embodiment, the encoding process and encoding processing circuitry operate to store source frames in a sequence of source frames being encoded to act as reference frames for source frames to be encoded subsequently, and the stored copy of the another frame (or frames) is then scaled to provide the scaled copy reference frame (or frames) which scaled copy reference frame (or frames) is then stored as the reference frame (or frames) to use for subsequently encoding the source frame or frames when there is a source frame resolution change.

The scaled copy of another frame, that is scaled to the resolution of the source frame at the new resolution to be encoded, may be generated (by the encoding processing circuitry) in any suitable and desired way. Scaling functionality may already be provided within the, e.g. VP9, encoding format that is being used, such that the encoding processing circuitry (e.g. configured to encode video image data according to a video encoding format (e.g. VP9)) may already be (and in an embodiment is) configured to perform scaling. In an embodiment such scaling functionality (that is already provided for other scaling operations) is used for generating the scaled copy of the another frame(s), such that it may not be necessary to provide (dedicated) additional hardware for this scaling.

In an embodiment the encoding processing circuitry comprises scaling processing circuitry (e.g. a scaling stage) configured (e.g. using the existing scaling functionality of the video encoding format) to generate the copy of the another frame(s) that is scaled to the resolution of the new source frame to be encoded. In an embodiment the encoding processing circuitry also comprises an encoding stage configured to encode the new source frame at the new resolution using (relative to) the scaled copy reference frame(s) to provide output encoded video image data for the new, different resolution source frame.

Thus in an embodiment the encoding processing circuitry comprises a scaling stage and an encoding stage (which may be a combined scaling and encoding stage). In an embodiment the result from the scaling stage, i.e. the scaled copy of the another frame, is passed to the encoding stage for encoding the source frame relative to the scaled copy of the previous frame (e.g. using motion compensation).

The different resolution source frame may be encoded using (relative to) the scaled copy reference frame(s) in any suitable and desired way. In an embodiment the source frame is encoded using the scaled copy reference frame(s) in the normal manner for the video encoding format, e.g. VP9, being used.

Thus in an embodiment each block of pixels within the source frame is encoded with respect to a corresponding block of pixels in the scaled copy reference frame(s). In an embodiment the encoded data block (for the source frame) comprises a motion vector pointing to the data for the scaled copy reference frame(s) and a residual describing the differences between the data encoded in the current data block (of the source frame) and the reference encoded data (of the scaled copy reference frame(s)).

It will be appreciated that as the source frame and the scaled copy reference frame(s) have the same resolution, the matching of the pixels of the scaled reference frame(s) to those of the source frame is relatively straightforward.

The scaled copy reference frame(s) may be encoded, for transmitting, along with the encoded video image data for the new source frame, in the bitstream to the decoder in any suitable and desired way.

In an embodiment the (or each) scaled copy reference frame is encoded using (relative to) the (original version of the) another frame that it is based on. Thus in an embodiment the scaled copy reference frame is encoded, e.g. relative to the another frame that it is a scaled copy of, in the same way that any other source frame in the sequence of source frames is encoded relative to a reference frame.

As the (and each) scaled copy reference frame is simply a scaled copy of the another frame in question (e.g. with no difference from the original reference frame other than the resolution), the Applicants have appreciated that it can be assumed that a scaled copy reference frame will and can be encoded using a (0,0) motion vector. Encoding a scaled copy reference frame in this way, e.g. using a (0,0) motion vector, is very cheap to encode (in terms of the bits used) since the encoded video data for a scaled copy reference frame may simply comprise a representation of the blocks in the frame and the (0,0) motion vector. Thus in an embodiment the encoding of a scaled copy reference frame does not require any residuals.

Furthermore, the, e.g., motion compensation filtering of the encoding processing circuitry may not need to be active for the encoding of the scaled copy of the another frame owing to the differences between the scaled copy of, and the original, another frame involving only scaling and no relative motion. Thus, when encoding the scaled copy reference frame, in an embodiment the motion compensation determination (operation) is disabled (where it is possible to do that).

This all then means that the additional generation and inclusion of a scaled copy reference frame in the sequence of encoded video frames can in practice add little extra burden on the encoded video data being transmitted for the sequence of source frames, thus, e.g., making it unlikely to affect the latency of the process.

Where a scaled copy reference frame is encoded using (relative to) the original (unscaled) another frame that the scaled copy reference frame is a scaled copy of, then the decoder will need the unscaled another frame to be able to decode and regenerate the scaled copy reference frame.

Correspondingly, where a scaled copy reference frame is generated from another source frame that is to be displayed (at its original resolution) then the decoder will need the unscaled another source frame in order to be able to display it.

Thus, in an embodiment, the another frame (e.g. the another source frame) that a scaled copy reference frame is a scaled copy of is encoded (at its original resolution) to provide output encoded video image data representing that another frame (at its original resolution), and the encoded video image data for that another frame (at its original resolution) is also transmitted to the video decoder.

Thus, in an embodiment, both the another frame that the scaled copy reference frame is a scaled copy of at its original resolution, and the scaled copy of that frame, is included in the sequence of encoded video frames that is sent to the decoder. In other words, the scaled copy reference frame(s) (the scaled copy of the another frame(s) that is to be used as a reference frame(s) when decoding the changed-resolution source frame) is included as an extra (additional) frame(s) in the sequence of encoded video frames that is sent to the decoder (as a frame(s) that is in addition to the sequence of encoded source frames that is sent to the decoder).

Thus, in an embodiment, the sequence of encoded video frames that is sent to the decoder will, when there is a change in resolution of the source frames being encoded, comprise an encoded source frame at a first resolution, followed (in an embodiment immediately) by an encoded frame at a second, different resolution that is a scaled copy of the source frame at the first resolution, followed (in an embodiment immediately) by an encoded source frame that is at the different, second resolution.

The another frame(s) can be encoded at its original resolution in any suitable and desired manner, e.g., and in an embodiment, in the normal manner for the video encoding format being used.

In an embodiment the video decoder correspondingly decodes the encoded video image data for the another frame(s) at its original resolution, and, in an embodiment, then uses the decoded another frame(s) at its original resolution when decoding the encoded video image data for the scaled reference frame to provide output video image data for the scaled reference frame.

In an embodiment, the original resolution version of the another frame(s) is also output, e.g., and in an embodiment, for display (and, in an embodiment, will be followed in the sequence of displayed frames by the source frame at the new, different resolution).

In an embodiment the scaled copy reference frame is identified as such in the sequence of frames of encoded video data that is transmitted (to the video decoder). In an embodiment the encoded video data that is transmitted comprises an indicator, e.g. a flag, e.g. in header data, associated with the scaled copy reference frame. This may be done in any suitable and desired way. This allows the scaled copy reference frame to be identified (e.g. by the decoding processing circuitry).

In an embodiment the sequence of encoded video frames that is sent to the decoder also includes an appropriate indication that the scaled copy reference frame should be used as a reference frame when decoding the "changed resolution" encoded source frame in the sequence of source frames.

This can be indicated in any suitable and desired manner, e.g., and in an embodiment, depending upon the video encoding format being used. In an embodiment this is done in the normal manner for indicating which reference frame is to be used for decoding an encoded frame in a sequence of video frames to be decoded for the video encoding format being used.

For example, an indicator, e.g. flag, that indicates (e.g. to the decoding processing circuitry) that the scaled copy reference frame is to be used for decoding the encoded new resolution source frame could be provided (associated) with (e.g. in header data associated with) an encoded scaled copy reference frame.

Additionally or alternatively, the encoded new resolution source frame may itself include or have associated with it (in metadata or other data associated with that encoded frame) an indication that the reference frame that it is to be decoded using is the scaled copy reference frame that is included in the sequence of encoded frames. This may be appropriate in video encoding systems where each encoded frame has associated with it an indication of the identity of the reference frame or frames relative to which the frame was encoded.

Additionally or alternatively, the decoder could be configured to, in effect, automatically use the scaled copy reference frame as the reference frame when decoding the encoded new resolution source frame. This could be done, for example, where a particular, e.g. predefined, pattern to be used to decide what to use for the reference frame is set, e.g., and in an embodiment, by the host processor, at the beginning of the encoding and decoding of the sequence of source frames (for the whole sequence of source frames).

Thus, in an embodiment, there is a fixed pattern that is used to determine what to use for the reference frame when encoding (and thus decoding) a source frame that is set by a host processor of the system for the sequence of source frames being encoded. An example of this is where, for example, the decoder is simply configured to use the previous encoded frame in the sequence as the reference frame for decoding the next encoded frame in the sequence. In such a case, the encoded frame following the encoded scaled copy reference frame would then automatically be decoded using the scaled copy reference frame.

In an embodiment, a scaled copy reference frame is not displayed (is not output for display by the video decoder) but rather is solely used as a reference frame for decoding the encoded changed-resolution source frame or frames. Thus in this case, the another frame that a scaled copy reference frame is a scaled copy of may, e.g., and in an embodiment is, displayed at its original resolution, and the new, changed resolution source frame is displayed at its resolution, but the scaled copy reference frame is not displayed.

The non-display or output of a scaled copy reference frame can be caused in any suitable and desired manner. In an embodiment this is done by including in the encoded video data that is sent to the decoder, some form of indication to instruct the decoder that the scaled copy reference frame is not to be displayed (that causes the decoder not to output the scaled copy reference frame for display).

Thus in an embodiment the method comprises (and the encoding processing circuitry is configured to) setting (denoting) a scaled copy reference frame as being a frame that is not to be displayed (as being a "hidden" frame) (e.g., and in an embodiment, in the encoded video image data representing the scaled copy reference frame that is transmitted to the video decoder).

A scaled copy reference frame may be identified as being (as having been set as) a "hidden" frame in the sequence of frames of encoded video data that is transmitted (to the video decoder) in any suitable and desired way. In an embodiment, the encoded video data that is transmitted comprises an indicator, e.g. a flag, e.g. in header data, associated with the scaled copy reference frame to indicate that the scaled copy of the reference frame should not be displayed (is a hidden frame).

The Applicants have recognised in this regard that the possibility of encoding extra, e.g. "hidden" frames, in the bitstream may already be provided for in the video encoding format being used (e.g. in the VP9 video encoding format, "hidden" frames are provided, albeit for a different purpose, e.g. when frames are encoded out of sequence and used to predict from future frames). This may mean that no changes to the video encoding format are needed in order to accommodate the scaled copy reference frames in the encoded bitstream and furthermore that no extra hardware (for the encoding and/or decoding) may be needed.

The Applicants have thus recognised that this provision of "hidden" frames, e.g. in VP9, may be used for a different use, namely to allow changes in resolution between frames in a sequence of frames to be encoded to be handled more efficiently, e.g. with reduced processing and power.

It will be appreciated that the source frames to be encoded are part of a sequence of source frames. Thus, for example, once a source frame at a different resolution to a previous frame in the sequence has been encoded (and, e.g., subsequently transmitted and decoded), the subsequently following source frames in the sequence of source frames may continue to be encoded in the manner as normally specified by the video encoding format (presuming the subsequently following frames in the sequence of frames are provided at the same new resolution), e.g. until a frame at a different resolution is provided for encoding (at which time the frame at the new resolution is encoded (and, e.g., transmitted and decoded) using the technology described herein).

Thus in an embodiment the encoding processing circuitry is configured to encode a sequence of source frames relative to a sequence of reference (e.g. previous source) frames (e.g. as per the video coding format being used) and, when a source frame in the sequence of source frames is received that has a resolution that is different to the resolution of the reference previous frame to which the source frame is desired to be encoded, the method of the technology described herein is performed, i.e. a scaled copy reference frame is generated and used to encode the source frame.

The above primarily discusses the encoding process.

The decoding process (and decoding processing circuitry) may decode the sequence of encoded source frames in any suitable and desired way, e.g., and in an embodiment, using the video encoding (and decoding) format being used. Thus in an embodiment the method comprises (and the decoding processing circuitry is configured to) receiving (a bitstream representing) a sequence of encoded frames of video data, and decoding the encoded frames of video data to provide a sequence of output video image frames for display.

In an embodiment the decoding process (the decoding processing circuitry) decodes each encoded source frame relative to a reference frame as appropriate (e.g. when the source frames have been encoded differentially, as opposed to being "key" frames).

In the case of a source frame that has been encoded using a scaled copy reference frame, the decoding processing circuitry will use the scaled copy reference frame to decode the encoded source frame (i.e. instead of the original "size" previous frame) (but will, in an embodiment, otherwise decode the source frame using the scaled copy reference frame as a reference frame in the same way as any other (differentially) encoded source frame in the sequence of encoded source frames would be decoded using their respective reference (e.g. previous source) frames in the video encoding format, e.g. VP9, being used).

Correspondingly, where the scaled copy reference frame was encoded relative to the (original) frame that it is a scaled copy of, in an embodiment the method comprises (and the decoding processing circuitry is configured to) decoding the encoded scaled copy reference frame, e.g., and in an embodiment, using the (original) frame that it is a scaled copy of.

In an embodiment, the decoding process and decoding processing circuitry is configured to decode each encoded source frame in a sequence of encoded source frames using the previous encoded frame in the sequence of encoded frames as a reference frame. Thus the decoding processing circuitry may decode encoded source frames in the order in which it receives them in the encoded bitstream, decoding each of them using (as a reference frame) the immediately preceding encoded frame in the bitstream.

In order to decode a source frame that has been encoded using a scaled copy reference frame (and thus the scaled copy reference frame is provided as an extra frame in the encoded bitstream), in an embodiment the decoding processing is configured to determine that such encoded frames are to be decoded using the scaled copy reference frame (instead of the original resolution source frame that the scaled copy has been generated from). This may be determined in any suitable and desired way, e.g. using an indication associated with the encoded source frame that identifies the reference frame to be used to decode it, and/or an indication associated with the encoded scaled copy reference frame that identifies it as such and/or that it should be used as the reference frame for decoding a or the next encoded frame in the sequence of encoded frames, and/or by following an indicated and/or predefined pattern for deciding which frame(s) to use as the reference frame when decoding a given frame.

In one embodiment the method comprises (and the decoding processing circuitry is configured to) determining when the sequence of encoded frames (received by the decoding processing circuitry) comprises a representation of a scaled copy reference frame (e.g. in addition to the bitstream comprising encoded video image for the frame at its original resolution), e.g. using an indication associated with the scaled copy reference frame. In an embodiment the scaled copy reference frame includes with it an indicator, such as a flag, that indicates to the decoder that it is to be used in the future as a reference frame, so that the decoder knows it should be stored for future use.

Once the decoding processing circuitry has identified an encoded frame as being a scaled copy reference frame, in an embodiment the scaled copy reference frame is used to decode the appropriate, e.g. next, encoded source frame in the sequence of frames. Thus in an embodiment the method comprises (and the decoding processing circuitry is configured to) setting the scaled copy reference frame as the reference frame for decoding the next encoded source frame in the sequence of frames to be decoded.

Once a scaled copy reference frame has been identified as such and, e.g., set as the reference frame to use, the, e.g. next, encoded source frame in the sequence of encoded source frames to be decoded may then be decoded by the decoding processing circuitry using the scaled copy reference frame, e.g. as appropriate for the video coding format, to provide output video image data for the frame.

In an embodiment, once the scaled copy reference frame has been identified by the decoding processing circuitry, the scaled copy reference frame is stored, e.g. in a buffer, for use when decoding an encoded source frame (at the new resolution).

It will be appreciated that the frames to be decoded will be (part of) a sequence of encoded frames. Thus, for example, once a source frame at the new resolution has been decoded, the subsequently following encoded source frames in the sequence of encoded source frames may continue to be decoded in the manner as normally specified by the video encoding format (presuming the subsequently following frames in the sequence of encoded source frames are provided at the same new resolution), e.g. until an encoded source frame at a different resolution is provided for decoding (at which time the frame at the new resolution is decoded using the technology described herein).

Thus in an embodiment the decoding processing circuitry is configured to decode a sequence of encoded source frames using a sequence of encoded reference (e.g. previous encoded source) frames (e.g. as per the video coding format in question) and, when an encoded source frame in the sequence of encoded source frames is received (e.g. indicated by a scaled copy reference frame being received) that has a resolution that is different to the resolution of the previous encoded source frame in the sequence of encoded frames, the method of the technology described herein is performed, i.e. a scaled copy reference frame is used to decode the encoded source frame.

In an embodiment the decoded encoded source frames (save, in an embodiment, for the decoded scaled copy reference frame) are output by the video decoder, e.g., and in an embodiment, for display. Thus, in an embodiment, the sequence of decoded encoded source frames (save, in an embodiment, for the decoded scaled copy reference frame) is displayed.

The decoded encoded source frames can be provided for display in any suitable and desired manner, e.g. by streaming them directly to a display device, and/or by storing them in memory (e.g. in frame buffers in memory) from where they can be read, e.g., and in an embodiment, by a display controller, for display.

As discussed above, in an embodiment, a scaled copy reference frame that is included in the sequence of encoded reference frames that is sent to the decoder is not itself displayed. In an embodiment this is, as discussed above, achieved by including an appropriate indication with the encoded version of that scaled copy reference frame, such that the decoder does not output it for display.

Thus, in an embodiment, the decoding process (the decoding processing circuitry) is operable to identify that a encoded scaled copy reference frame is not to be displayed, and to, in response to such an identification, cause the scaled copy reference frame not to be displayed.

Thus, in an embodiment, the video decoder will receive a sequence of encoded video frames comprising, inter alia, an encoded source frame at a first resolution, followed (in an embodiment immediately) by an encoded source frame at a second, different resolution that is a scaled copy of the source frame at the first resolution, followed (in an embodiment immediately) by an encoded source frame that is at the different, second resolution, and will decode the encoded source frame at the first resolution, the encoded frame at the second, different resolution, and the encoded source frame that is at the different, second resolution, and output, e.g., and in an embodiment, for display, the decoded encoded source frame at the first resolution, and the decoded encoded source frame that is at the different, second resolution, but will not output for display the decoded encoded frame at the second, different resolution that was a scaled copy of the source frame at the first resolution.

It will be appreciated that the encoding and the decoding of the sequence of frames may be (and in an embodiment is) performed on separate apparatus (e.g. devices), e.g. at separate times and, e.g., in separate places. Thus, although the technology described herein has been described above with reference to the encoding and decoding of video data, the technology described herein also extends to the encoding of video image data alone.

An embodiment of the technology described herein comprises a method of encoding frames of a sequence of frames of video data when using a video encoding process that encodes at least some frames of a sequence of source video frames to be encoded using one or more source frames in the sequence of source video frames to be encoded as reference frames, the method comprising:

when it is desired to encode a new source frame in a sequence of source frames being encoded that has a resolution that is different to the resolution of another frame in the sequence of source frames being encoded that is to act as a reference frame for the new source frame:

generating a scaled copy of the another frame in the sequence of source frames being encoded that is to act as a reference frame for the new source frame that is scaled to the resolution of the new source frame to act as a reference frame for the new source frame;

encoding the generated scaled copy of the another frame to provide output encoded video image data representing the generated scaled copy of the another frame;

encoding the new source frame using the scaled copy of the another frame as a reference frame to provide output encoded video image data representing the new source frame; and outputting the encoded video image data representing the scaled copy of the another frame and the encoded video image data representing the new source frame.

Another embodiment of the technology described herein comprises an apparatus for encoding frames of a sequence of frames of video data, the apparatus comprising:

encoding processing circuitry configured to:

encode at least some frames of a sequence of source video frames to be encoded using one or more source frames in the sequence of source video frames to be encoded as reference frames;

the encoding processing circuitry further being configured to:

when it is desired to encode a new source frame in a sequence of source frames being encoded that has a resolution that is different to the resolution of another frame in the sequence of source frames being encoded that is to act as a reference frame for the new source frame:

generate a scaled copy of the another frame in the sequence of source frames being encoded that is to act as a reference frame for the new source frame that is scaled to the resolution of the new source frame to act as a reference frame for the new source frame;

encode the generated scaled copy of the another frame to provide output encoded video image data representing the generated scaled copy of the another frame;

encode the new source frame using the scaled copy of the another frame as a reference frame to provide output encoded video image data representing the new source frame; and output the encoded video image data representing the scaled copy of the another frame and the encoded video image data representing the new source frame.

Correspondingly, the technology described herein extends to the decoding of video image data alone.

Thus, an embodiment of the technology described herein comprises a method of decoding frames of a sequence of frames of encoded video data when using a video decoding process that decodes at least some frames of a sequence of encoded video frames using one or more frames in the sequence of encoded video frames as reference frames, the method comprising:

receiving encoded video image data representing a sequence of video frames for decoding, the encoded video image data representing a sequence of video frames including at least encoded video image data representing a scaled copy of another frame in the sequence of encoded frames and encoded video image data representing a video frame that has been encoded using the scaled copy of the another frame as a reference frame;

decoding the encoded video image data for the scaled copy of the another frame; and decoding the encoded video image data for the video frame that has been encoded using the scaled copy of the another frame as a reference frame using the decoded scaled copy of the another frame as a reference frame to provide output video image data for that video frame.

Another embodiment of the technology described herein comprises an apparatus for decoding frames of a sequence of frames of encoded video data when using a video decoding process that decodes at least some frames of a sequence of encoded video frames using one or more frames in the sequence of encoded video frames as reference frames, the apparatus comprising:

decoding processing circuitry configured to:

receive encoded video image data representing a sequence of video frames for decoding, the encoded video image data representing a sequence of video frames including at least encoded video image data representing a scaled copy of another frame in the sequence of encoded frames and encoded video image data representing a video frame that has been encoded using the scaled copy of the another frame as a reference frame;

decode the encoded video image data for the scaled copy of the another frame; and decode the encoded video image data for the video frame that has been encoded using the scaled copy of the another frame as a reference frame using the decoded scaled copy of the another frame as a reference frame to provide output video image data for that video frame.

As will be appreciated by those skilled in the art, these embodiments of the technology described herein can, and in an embodiment do, include any one or more or all of the optional features of the technology described herein, as appropriate. In particular, in an embodiment the encoding process correspondingly includes the optional features discussed above in relation to the encoding process, and in an embodiment the decoding process correspondingly includes the optional features discussed above in relation to the decoding process.

Thus, for example, in an embodiment the encoding process designates the scaled copy reference frame as being a frame that should not be displayed.

Correspondingly, in an embodiment the decoding process comprises determining when a frame in the sequence of frames of encoded video data is to be decoded using a scaled copy of another frame as a reference frame, and/or determining when a frame in the sequence of frames of encoded video data comprises a scaled copy of another frame. Similarly, in an embodiment the decoding operation further comprises outputting the decoded frame that was encoded using a scaled copy of another frame as a reference frame for display, but not outputting the decoded scaled copy of the another frame for display (and, correspondingly, in an embodiment comprises identifying that the encoded scaled copy of the another frame should not be output for display).

In an embodiment the processing circuitry (e.g. including the encoding circuitry, the decoding circuitry, the processing circuitry for transmitting the encoded video image data, the host circuitry and/or the scaling circuitry) may be in communication with one or more memories and/or memory devices that store the data described herein, and/or that store software for performing the processes described herein. The processing circuitry may also be in communication with a host microprocessor, and/or with a display for displaying images based on the data described above, or a video processor for processing the data described above.

The technology described herein may be implemented in any suitable video processing system, such as a suitably configured micro-processor based system. In an embodiment, the technology described herein is implemented in a computer and/or micro-processor based system. In an embodiment, the technology described herein is implemented in (or as) a video decoder, encoder and/or processor.

The system may include any suitable and desired components or elements to allow the operation in the manner of the technology described herein, such as, for example, a rendering unit (to which the output (decoded) video image data is provided, e.g. from the decoding processing circuitry) for rendering, an output, e.g. a display, to which the rendered frames of video are provided from the rendering unit, and memory for storing the data that is required (such as the unencoded video data, the consequent encoded data blocks and the consequent output (decoded) video data).

When the encoded video image data has been produced (e.g. as a bitstream of the encoded data), it may then be handled as desired for future use, e.g. by being suitably stored and/or by being transmitted to a decoder for decoding (which in an embodiment is the apparatus for decoding encoded video image data of the technology described herein). The decoder may then subsequently decode the encoded video data, e.g. using the decoding method of the technology described herein. In an embodiment he decoded video data (frames) are then output, e.g., and in an embodiment, stored and/or displayed.

The various functions of the technology described herein may be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., when desired.

Subject to any hardware necessary to carry out the specific functions discussed above, the video processor can otherwise include any one or more or all of the usual functional units, etc., that video encoders, decoders, and processors include.

It will also be appreciated by those skilled in the art that all of the described embodiments of the technology described herein may, and in an embodiment do, include, as appropriate, any one or more or all of the features described herein.

The methods of the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

Embodiments of the technology described herein will now be described in the context of encoding and decoding video image data using the VP9 encoding format.

FIG. 1 shows a system 21 for encoding and decoding video image data according to an embodiment of the technology described herein, i.e. that will typically be used to encode and decode video image data, e.g., using the VP9 encoding format.

The video encoding and decoding system 21 shown in FIG. 1 includes a device 1 (e.g. a video camera) that generates and then encodes video image data. The encoded video image data is then transmitted (streamed) over a, e.g. wireless, link 3 (e.g. the internet) to a, e.g. remote, device 2 (e.g. a mobile telephone) that decodes the encoded video image data and displays the decoded video image data.

Video encoding formats such as VP9 can enable a significant reduction in the file size of the video image data for transmission (which thus aids the efficient streaming of the video image data) without a significant visible loss of image quality when the video images are viewed.

The video image data is typically generated by the video generating device 1 as a sequence of frames. In "differential" video coding standards such as VP9, most of the "source" frames in the sequence of frames to be encoded are encoded with respect (reference) to a "reference" frame (or frames) (typically a previous source frame in the sequence of frames).

In the VP9 encoding scheme, this differential encoding is done by dividing each frame of video image data into a plurality of rectangular blocks of pixels of the frame, with each block being encoded and decoded individually. A given block of data may have an associated motion vector that points to a corresponding block of data in a reference frame, and a residual that describes the differences between the data in the current data block and the data in the reference frame. (This thereby allows the video data for the block of the (current) frame to be constructed from the encoded video data pointed to by the motion vector and the difference data describing the differences between that block and the block of the current video frame.)

Figure 2:
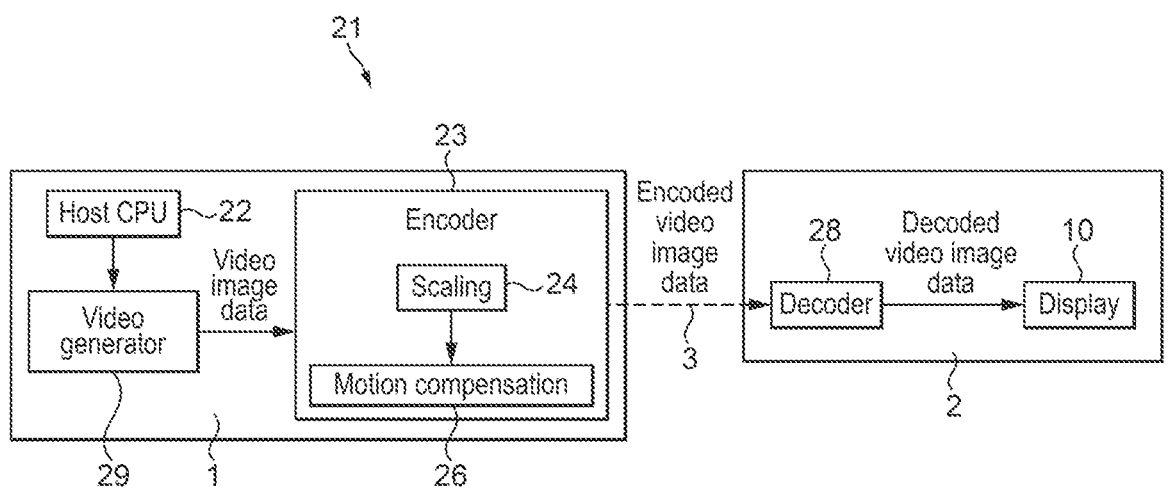

FIG. 2 shows the system 21 for encoding and decoding video image data according to an embodiment of the technology described herein in more detail. This shows a more detailed view of the video generating and encoding device 1 and the decoding and display device 2 shown in FIG. 1.

The video generating and encoding device 1 includes a video frame generator 29 (e.g. a video camera, image signal processor or GPU) that generates and/or provides a sequence of frames video image data for encoding and a host CPU 22. The video generating and encoding device 1 also includes an encoder 23 for encoding the sequence of frames of video image data. The encoder 23 (which will be described in more detail with reference to FIGS. 3 and 4) includes a scaling stage 24 followed by a motion compensation stage 26.

On the other side of the transmission link 3, the decoding and display device 2 includes a decoder 28 for decoding the encoded video image data that has been transmitted over the link 3 from the video generating and encoding device 1 and a display 10 (e.g. a display screen on a mobile telephone) for displaying the decoded video image data.

As will be appreciated by those skilled in the art, the video generating encoding device 1 and the decoding and display device 2 may include other elements and components not shown in FIG. 2. FIG. 2 simply shows those elements and components of the video generating and encoding device 1 and the decoding and display device 2 that are relevant to the operation of the present embodiments in the manner of the technology described herein.

Figure 3:
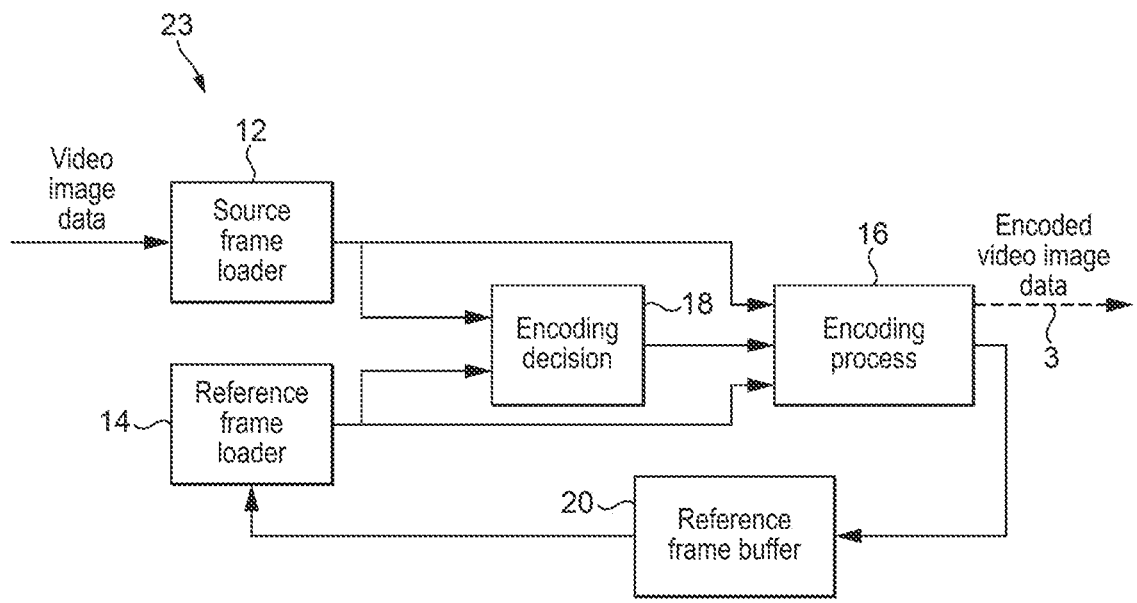
FIGS. 3 and 4 show schematically an encoder for encoding video image data according to an embodiment of the technology described herein.
Figure 4:
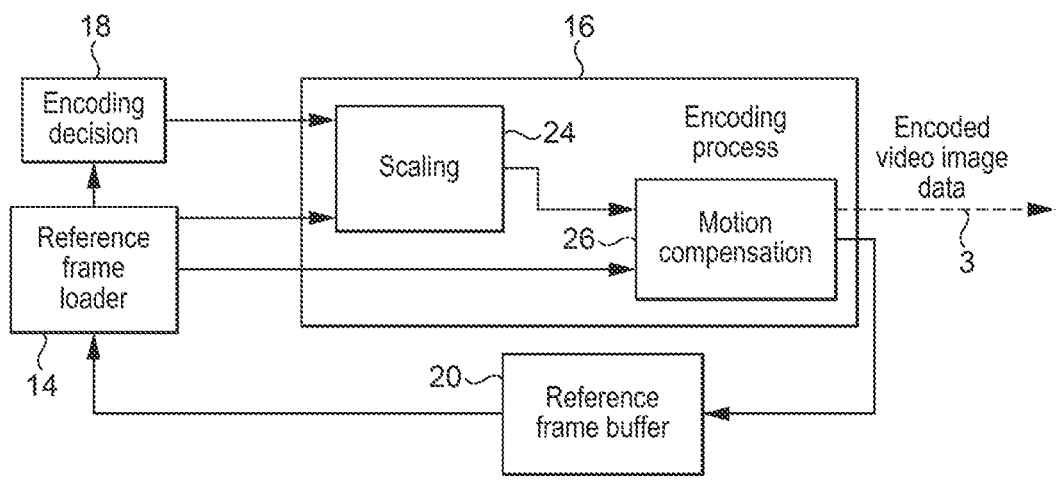

FIGS. 3 and 4 show the encoder 23 shown in FIG. 2 in more detail, each showing different levels of detail of the encoder 23.

FIG. 3 shows that the encoder 23 includes "source" and "reference" frame loaders 12, 14 that provide the sequence of frames to be encoded relative to each other to the encoding processing stage 16. The source frame loader 12 is configured to receive input video image data for "source" frames (new frames in the sequence of frames to be encoded) from the video generator 29 shown in FIG. 2. The reference frame loader 14 is configured to receive the video image data (pixel data) for source frames that have been encoded and that are now to be used as "reference" frames from the encoding processing stage 16 such that these can be provided to and used by the encoding processing stage 16 to use as the reference frames to encode subsequent new "source" frames.

The encoder 23 also includes an encoding decision stage 18 that is configured to receive at least some of the video image data (or information relating to this data) for the source and reference frames from the source and reference frame loaders 12, 14 respectively. The encoding decision stage 18 is also in communication with the encoding processing stage 16 so that it can instruct the encoding processing stage 16 as to how to encode the sequence of source frames.

The output encoded (source) frames from the encoding processing stage 16 are transmitted as a bitstream of encoded video image data over the link 3. The encoding processing stage 16 also sends the (full) pixel data for the source frames it is encoding to a reference frame buffer 20 from where they can be accessed by the reference frame loader 14.

FIG. 4 shows, in addition to the encoding decision stage 18, the reference frame loader 14 and the reference frame buffer 20, more detail of the encoding processing stage 16. The encoding processing stage 16, which encodes the sequences of source frames relative to respective reference frames, includes a scaling stage 24 and a motion compensation stage 26 (as is also shown in FIG. 2). The scaling stage 24 receives inputs from the reference frame loader 14 and the encoding decision stage 18 (which itself receives an input from the reference frame loader 14, as well as the source frame loader as shown in FIG. 3). The motion compensation stage 26 receives inputs from the scaling stage 24 or the reference frame loader 14.

Although the scaling stage 24 and motion compensation stage 26 have been shown as "separate" stages in the Figures, it would equally be possible for those operations to be combined into one operation (into a combined scaling and motion compensation stage), when desired.

Operation of the video generation and encoding device 1 for encoding video image data according to an embodiment of the technology described herein will now be described with reference to the flow chart shown in FIG. 5, the schematic of how a "hidden" frame is used in FIG. 6, and the system shown in FIGS. 1 to 4.

Figure 5:
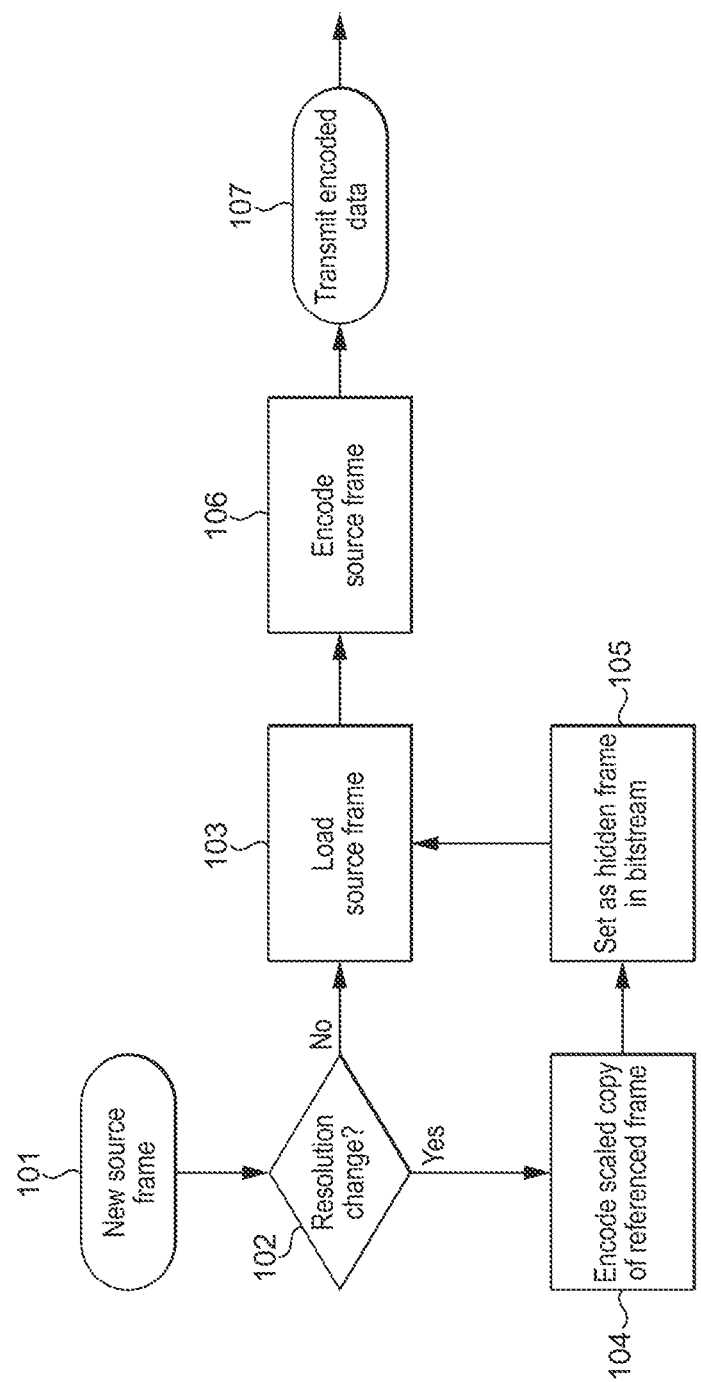
FIG. 5 shows a flow chart of the operation for encoding video image data according to an embodiment of the technology described herein.

FIG. 5 shows a flow chart of the operation for encoding video image data according to an embodiment of the technology described herein. FIG. 6 shows how a scaled copy reference frame (which is marked as a "hidden" frame) is used in accordance with an embodiment of the technology described herein.

Figure 6:
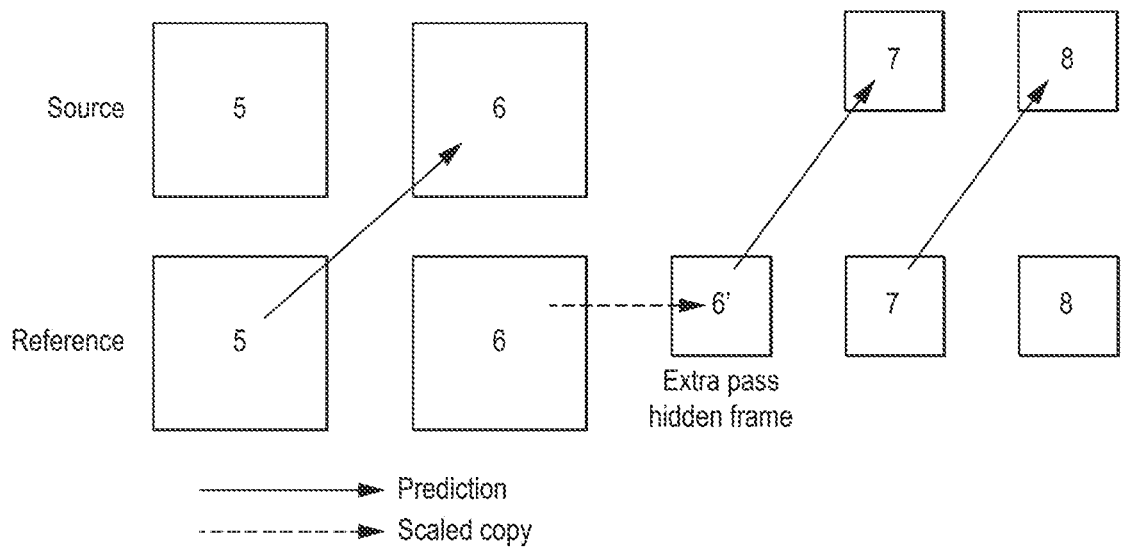
FIG. 6 shows schematically how a scaled copy of a reference frame is used in accordance with an embodiment of the technology described herein.

In operation, the video generator 29 generates or provides video image data that represents a sequence of frames (e.g. as shown in FIG. 6) to the encoder 23 (step 101, FIG. 5), where it is received by the source frame loader 12. Information associated with each frame in the sequence of frames (e.g. including header data) is passed to the encoding decision stage 18 to determine how each frame should be encoded.

For a first ("key") frame in a sequence of frames (e.g. the first source frame 5 shown in FIG. 6), there is no previous (reference) frame to encode the source frame 5 relative to. The encoding decision stage 18 determines that this first source frame 5 is to be encoded as a key frame (i.e. without reference to any other frame) and this decision is sent to the encoding processing stage 16. The encoding processing stage 16 also receives the video image data representing the first source frame 5 from the source frame loader 12 (step 103, FIG. 5), and encodes this frame as a key frame (step 106, FIG. 5).

The encoded video image data for the first source frame 5 is then transmitted over a link 3 to the decoder 28 (step 107, FIG. 5). The pixel data for the first source frame 5 is also written into the reference frame buffer 20 so that it may be used in the differential encoding of subsequent frames in the sequence of frames, i.e. as shown in FIG. 6 the first source frame 5 is now the first reference frame 5 for the second source frame 6.

For the second source frame 6 in the sequence of frames, the source frame loader 12 receives this frame 6 (step 101, FIG. 5) (and the reference frame loader 14 reads the previous reference frame 5 from the reference frame buffer 20) and the encoding decision stage 18 determines from these frames 5, 6 that the new source frame 6 is to be encoded as an "inter" frame (i.e. relative to the previous reference frame 5). The encoding decision stage 18, in the absence of receiving a signal from the host CPU 22 to indicate that the resolution of the new source frame 6 is different from the resolution of the reference previous frame 5, can then simply proceed as normal (i.e. as per the VP9 video coding format) in encoding the new source frame 6 relative to the previous reference frame 5 (i.e. owing to the new source frame 6 having the same resolution as the reference previous frame 5 (step 102, FIG. 5)).

The encoding decision stage 18 sends these decisions to the encoding processing stage 16 and the encoding processing stage 16 loads the video image data representing the second source frame 6 from the source frame loader 12 (step 103, FIG. 5). The encoding processing stage 16 then uses the video image data representing the second source frame 6 along with the encoded video image data representing the reference previous frame 5 from the reference frame buffer 20 (which is loaded by the reference frame loader 14) to encode the second source frame 6 relative to the reference previous frame 5 (step 106, FIG. 5), e.g. using the motion compensation stage 26.

The encoded video image data for the second source frame 6 is then transmitted over a link 3 to the decoder 28 (step 107, FIG. 5). The pixel data for the second source frame 6 is also written into the reference frame buffer 20 so that it may be used in the differential encoding of subsequent frames in the sequence of frames, i.e. as shown in FIG. 6 the second source frame 6 is now stored as the reference frame to be used for the next source frame.

It is assumed that at this time, the bandwidth available for transmitting the encoded video image data is reduced. This is signalled to and/or detected by the host CPU 22, which as a result controls the video generator 29 to generate and/or provide the third source frame 7 at a lower resolution than the previous source frame 6, such that the resultant encoded video image data for the third source frame 7 will be reduced in comparison to better match the reduced bandwidth. The host CPU 22 also indicates to the encoder 23 that the new source frame 7 has a different (in this case lower) resolution.

For the third source frame 7 in the sequence of frames, the source frame loader 12 receives this frame 7 (step 101, FIG. 5) (and the reference frame loader 14 reads the stored reference previous frame 6 from the reference frame buffer 20) and the encoding decision stage 18 determines from these frames 6, 7 that the new source frame 7 is to be encoded as an "inter" frame (i.e. relative to the previous frame 6).

As the third source frame 7 has a different (i.e. lower) resolution from the second source frame 6, the encoding decision stage 18 receives and notes the indication from the host CPU 22 that the resolution has changed (step 102, FIG. 5).

As can be seen from FIG. 4, in this instance the encoding decision stage 18 indicates to the scaling stage 4 of the encoding processing stage 16 that the new source frame 7 has a different resolution from the stored reference previous frame 6. This causes the reference frame loader 14 to load the reference previous frame 6 into the scaling stage 24 and the scaling stage 24 generates a scaled copy 6' of the reference previous frame 6 at the same resolution as the new source frame 7 (step 104, FIG. 5).

The scaled copy 6' generated by the scaling stage 24 is encoded relative to the reference previous frame 6 (at the previous resolution) (step 104, FIG. 5). It will be appreciated that this process requires no motion compensation and so the motion compensation stage 26 is not active during the encoding of the scaled copy reference frame 6' (this frame is encoded simply using a (0,0) motion vector).

The scaled copy reference frame 6' is also set as a "hidden" frame in the encoded video image data to be transmitted by marking the scaled copy reference frame 6' with a flag (e.g. in header data associated with the frame) (step 105, FIG. 5), so as to indicate to the decoder that this frame is not for displaying (and so is only to be used to decode the new source frame 7).

The pixel data for the scaled copy reference frame 6' is also written into the reference frame buffer 20 so that it may be used in the differential encoding of subsequent frames in the sequence of frames, i.e. as shown in FIG. 6 the scaled copy reference frame 6' is now stored as the reference frame to be used for the next source frame.

The encoding of the new source frame 7 then proceeds as before, except that the scaled copy reference frame 6' (at the new resolution) instead of the previous frame 6 (at the previous resolution) is used to encode the new source frame 7.

Thus, the encoding processing stage 16 uses the video image data representing the third source frame 7 along with the scaled copy reference frame 6' to encode the third source frame 7 relative to the scaled copy reference frame 6' at the new resolution (step 106, FIG. 5).

The encoded video image data for the third source frame 7 is then transmitted over a link 3, along with the encoded scaled copy reference frame 6', to the decoder 28 (step 107, FIG. 5). As before, the pixel data for the third source frame 7 is also written into the reference frame buffer 20 so that it may be used in the differential encoding of subsequent frames in the sequence of frames, i.e. as shown in FIG. 6 the third source frame 7 is now the reference frame for the fourth source frame 8.

The encoding of the subsequent frames (the fourth source frame 8 onwards) continues as described above, with the encoded video image data for these frames being transmitted from the encoder 23 over a link 3 to the decoder 28 for decoding. As can be seen from FIG. 6, the fourth source frame 8 has the same resolution as the third frame 7, so the fourth source frame 8 is encoded relative to the third frame 7 in the same manner described above for the second source frame 6 relative to the first frame 5.

However, when a subsequent source frame is received that has a resolution that is different from the previous frame, this new source frame at the new resolution is encoded in the same manner described above for the third source frame 7, i.e. by first generating a scaled copy of the previous frame, and then encoding the new source frame at the new resolution relative to the scaled copy of the previous frame.

Operation of the decoding and display device 2 for decoding video image data according to an embodiment of the technology described herein will now be described with reference to the flow chart shown in FIG. 7, the schematic of how a "hidden" frame is used in FIG. 6, and the system shown in FIGS. 1 to 4.

Figure 7:
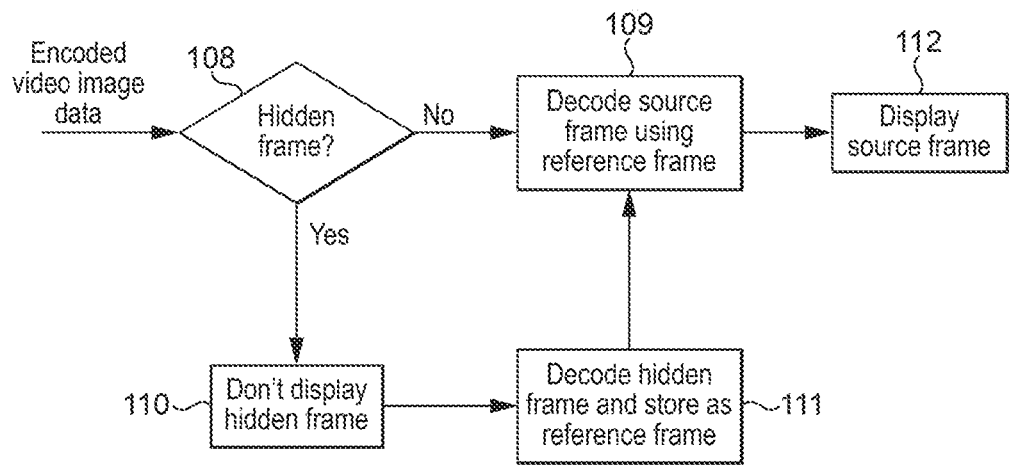
FIG. 7 shows a flow chart of the operation for decoding video image data according to an embodiment of the tech- nology described herein.

FIG. 7 shows a flow chart of the operation for decoding video image data according to an embodiment of the technology described herein.

Following the encoding of the video image data representing a sequence of frames, the encoded video image data is transmitted from the encoder 23 to the decoder 28 over a link 3 (step 107, FIG. 5), as described above.

The decoder 28 receives the encoded video image data representing the sequence of frames (e.g. as shown in FIG. 6). The decoder 28 then decodes the differentially encoded video image data by decoding one frame relative to a previous frame (if this is how the frames have been encoded).

For a first ("key") frame in a sequence of frames (e.g. the first frame 5 shown in FIG. 6), there is no previous (reference) frame to use to decode the frame 5. The decoder 28 thus determines that this first source frame 5 is to be decoded as a key frame (i.e. without reference to any other frame) and decodes the first frame 5 as such. The decoded video image data for this frame is then output to and displayed on the display 10.

For the second (source) frame 6 in the sequence of frames, the decoder 28 determines that this frame has been encoded relative to the first (reference) frame 5 (and thus should be decoded as such). Furthermore, in the absence of the previous reference frame 5 being marked as a "hidden" frame (step 108, FIG. 7), the decoder 28 simply proceeds as normal in decoding the new source frame 6 using the reference previous frame 5 (i.e. owing to the new source frame 6 having the same resolution as the reference previous frame 5). The decoder is then able to decode the second source frame 6 using the first reference frame 5 (step 109, FIG. 7) and output the decoded video image data for the display 10 to display (step 112, FIG. 7).

Next, the decoder 28 receives the scaled copy reference frame 6' in the bitstream of encoded video image data. The scaled copy reference frame 6' has been encoded with a flag to indicate that it is "hidden" frame (i.e. to indicate that the scaled reference frame 6' is not to be displayed), which is recognised by the decoder 28. The decoder 28 thus knows that the scaled reference frame 6' is "hidden" (step 108, FIG. 7) and that it should not be displayed (step 110, FIG. 7).

The decoder 28 then decodes the encoded scaled copy reference frame 6' (using the previous frame 6 as a reference frame (as that is the frame that the scaled copy reference frame 6' has been encoded with respect to)), and stores (the pixel data for) that decoded scaled copy reference frame 6' as the reference frame to use for decoding the next encoded source frame (step 111, FIG. 7).

Next, the decoder 28 receives the third source frame 7 in the bitstream of encoded video image data. This encoded third source frame 7 has associated with it an indication (e.g. a flag) to tell the decoder to use the scaled copy reference frame 6' as the reference frame for decoding the third source frame 7. Thus the decoder 28 knows that it should use the scaled copy reference frame 6' (at the same resolution as the third source frame 7) instead of the second frame 6 (at a different resolution from the third source frame 7) as the reference frame for decoding the third source frame 7.

The decoder 28 then decodes the encoded video image data for the third source frame 7 using the scaled copy reference frame 6' (step 109, FIG. 7) and outputs the decoded video image data for the third source frame 7 to the display 10 for displaying (step 112, FIG. 7).

The decoding of the subsequent frames (the fourth frame 8 onwards) continues as described above, with the encoded video image data for these frames being decoded by the decoder 28 for displaying by the display 10. As can be seen from FIG. 6, the fourth frame 8 has the same resolution as the third reference frame 7, so the fourth frame 8 is decoded using the third frame 7 in the same manner described above for the second frame 6 relative to the first frame 5.

However, when a subsequent hidden frame is received, indicating that this frame is not to be displayed but is to replace the previous reference frame and to be used when decoding the next frame, the next frame at the new resolution is decoded in the same manner described above for the third frame 7, i.e. using the scaled copy of the previous frame.

It will be appreciated from the above, that in operation of the embodiments of the technology described herein, the decoder will receive a sequence of encoded video frames corresponding to the sequence of "reference" frames shown in FIG. 6, but will output for display the sequence of frames corresponding to the frames labelled as "source" frames in FIG. 6. Thus the scaled copy reference frame 6' will be included in the sequence of frames that is transmitted to the decoder and that the decoder decodes, but will not actually be displayed.

In the above embodiments, a source frame that is to be encoded with reference to another source frame is encoded with reference to the immediately preceding source frame in the sequence of source frames to be encoded. However, other arrangements would be possible, and in general a given source frame can be encoded with reference to any other source frame in the sequence of source frames (i.e. both a previous or a future source frame in the sequence of source frames), when and as desired. It would also be possible for a source frame to be encoded with reference to plural other source frames in the sequence of source frames (e.g. both a previous and a future source frame in the sequence of source frames), when desired. The present embodiments extend to such arrangements.

It can be seen from the above that the technology described herein, in its embodiments at least, comprises an efficient and effective mechanism for handling resolution changes when encoding video data in a video encoding system such as VP9.

This is achieved, in the embodiments of the technology described herein at least, by generating a scaled copy of another frame to act as a reference frame to be used when encoding a source frame at a new (changed) resolution. This means that the source frame having the new resolution can then be encoded relative to a frame having the same resolution (namely the scaled copy of the another frame), rather than having to use the different resolution another frame. As the encoding processing circuitry may already be configured to perform scaling, it may not be necessary to provide any additional, e.g. dedicated, hardware in order to generate the scaled reference frame.

In an embodiment, the scaled copy of the another frame that is to be used as a reference frame when there is a resolution change is denoted as being a "hidden" frame, such that it will not itself be displayed.

The foregoing detailed description has been presented for the purposes of illustration and description. It is not intended to be exhaustive or to limit the technology described herein to the precise form disclosed. Many modifications and variations are possible in light of the above teaching. The described embodiments were chosen in order to best explain the principles of the technology, and its practical application, to thereby enable others skilled in the art to best utilise the technology, in various embodiments and with various modifications as are suited to the particular use contemplated. It is intended that the scope be defined by the claims appended hereto.

What is claimed is:

1. A method of encoding and decoding frames of a sequence of frames of video data when using a video encoding process that encodes at least some frames of a sequence of source video frames to be encoded using one or more source frames in the sequence of source video frames to be encoded as reference frames; the method comprising: determining when a new source frame in a sequence of source frames being encoded has a resolution that is different than the resolution of another frame in the sequence of source frames being encoded that is to act as a reference frame for the new source frame; and as a result of it having determined that the new source frame in the sequence of source frames being encoded has a resolution that is different than the resolution of another frame in the sequence of source frames being encoded that is to act as a reference frame for the new source frame: generating a scaled copy of the another frame in the sequence of source frames being encoded, wherein the another frame is scaled to the resolution of the new source frame, and wherein the scaled copy of the another frame is generated to act as a reference frame for the new source frame; encoding the generated scaled copy of the another frame to provide output encoded video image data representing the generated scaled copy of the another frame, wherein the generated scaled copy of the another frame is encoded relative to the another frame using a (0,0) motion vector; encoding the new source frame using the scaled copy of the another frame as a reference frame to provide output encoded video image data representing the new source frame; and transmitting the encoded video image data representing the scaled copy of the another frame and the encoded video image data representing the new source frame to a video decoder; and at the video decoder: decoding the encoded video image data for the scaled copy of the another frame; and decoding the encoded video image data for the new source frame using the decoded scaled copy of the another frame as a reference frame to provide output video image data for the new source frame.

2. The method as claimed in claim 1, comprising indicating that the new source frame to be encoded has a resolution that is different than the resolution of the another source frame.

3. The method as claimed in claim 1, comprising encoding the generated scaled copy of the another frame using the another frame.

4. The method as claimed in claim 1, comprising including an indication that the scaled copy of the another frame is a frame that is not to be displayed in the encoded video image data representing the scaled copy of the another frame that is transmitted.

5. The method as claimed in claim 1, comprising encoding the another source frame to provide output encoded video image data representing the another source frame and transmitting the encoded video image data representing the another source frame to the video decoder.

6. The method as claimed in claim 1, comprising, at the video decoder: not displaying the decoded scaled copy of the another frame.

7. A system for encoding and decoding frames of a sequence of frames of video data, the system comprising: encoding processing circuitry capable of: encoding at least some frames of a sequence of source video frames to be encoded using one or more source frames in the sequence of source video frames to be encoded as reference frames; the encoding processing circuitry further being capable of: determining when a new source frame in the sequence of source frames being encoded has a resolution that is different than the resolution of another frame in the sequence of source frames being encoded that is to act as a reference frame for the new source frame; and as a result of it having been determined that the new source frame in the sequence of source frames being encoded has a resolution that is different than the resolution of another frame in the sequence of source frames being encoded that is to act as a reference frame for the new source frame: generating a scaled copy of the another frame in the sequence of source frames being encoded, wherein the another frame is scaled to the resolution of the new source frame, and wherein the scaled copy of the another frame is generated to act as a reference frame for the new source frame; encoding the generated scaled copy of the another frame to provide output encoded video image data representing the generated scaled copy of the another frame, wherein the generated scaled copy of the another frame is encoded relative to the another frame using a (0,0) motion vector; and encoding the new source frame using the scaled copy of the another frame as a reference frame to provide output encoded video image data representing the new source frame; the system further comprising: processing circuitry capable of, as a result of it having been determined that the new source frame in the sequence of source frames being encoded has a resolution that is different than the resolution of another frame in the sequence of source frames being encoded that is to act as a reference frame for the new source frame: transmitting the encoded video image data representing the scaled copy of the another frame and the encoding video image data representing the new source frame to a video decoder; and a video decoder comprising decoding processing circuitry capable of: when the decoding processing circuitry receives encoded video image data for a source frame that was encoded using a scaled copy of another source frame as a reference frame: decoding received encoded video image data for the scaled copy of the another source frame; and decoding the encoded video image data for the source frame that was encoded using a scaled copy of another source frame as a reference frame using the decoded scaled copy of the another frame as a reference frame to provide output video image data for the source frame that was encoded using a scaled copy of another source frame as a reference frame.

8. The system as claimed in claim 7, comprising host processing circuitry capable of indicating to the encoding processing circuitry when the resolution of the new source frame in the sequence of frames to be encoded is different than the resolution of the another frame in the sequence of source frames to be encoded.

9. The system as claimed in 7, wherein the encoding processing circuitry is capable of encoding the generated scaled copy of the another frame using the another frame.

10. The system as claimed in claim 7, wherein encoding processing circuitry is capable of including an indication in the encoded video image data representing the scaled copy of the another frame that is transmitted that the scaled copy of the another frame is a frame that is not to be displayed.

11. The system as claimed in claim 7, wherein the encoding processing circuitry is capable of encoding the another frame to provide output encoded video image data representing the another frame and the processing circuitry is capable of transmitting the encoded video image data representing the another source frame to the video decoder.

12. The system as claimed in claim 7, wherein the decoding processing circuitry is capable of not displaying the decoded scaled copy of the another frame.

13. A non-transient computer readable storage medium storing computer software code which when executing on a data processor performs a method of encoding and decoding frames of a sequence of frames of video data when using a video encoding process that encodes at least some frames of a sequence of source video frames to be encoded using one or more source frames in the sequence of source video frames to be encoded as reference frames; the method comprising: determining when a new source frame in a sequence of source frames being encoded has a resolution that is different than the resolution of another frame in the sequence of source frames being encoded that is to act as a reference frame for the new source frame; and as a result of it having been determined that the new source frame in the sequence of source frames being encoded has a resolution that is different than the resolution of another frame in the sequence of source frames being encoded that is to act as a reference frame for the new source frame: generating a scaled copy of the another frame in the sequence of source frames being encoded, wherein the another frame is scaled to the resolution of the new source frame, and wherein the scaled copy of the another frame is generated to act as a reference frame for the new source frame; encoding the generated scaled copy of the another frame to provide output encoded video image data representing the generated scaled copy of the another frame, wherein the generated scaled copy of the another frame is encoded relative to the another frame using a (0,0) motion vector; encoding the new source frame using the scaled copy of the another frame as a reference frame to provide output encoded video image data representing the new source frame; and transmitting the encoded video image data representing the scaled copy of the another frame and the encoded video image data representing the new source frame to a video decoder; and at the video decoder: decoding the encoded video image data for the scaled copy of the another frame; and decoding the encoded video image data for the new source frame using the decoded scaled copy of the another frame as a reference frame to provide output video image data for the new source frame.

* * * * *